(12) United States Patent
Moriyasu et al.

(10) Patent No.: US 11,175,830 B2
(45) Date of Patent: Nov. 16, 2021

(54) STORAGE SYSTEM AND DATA RESTORATION METHOD

(71) Applicant: Hitachi, Ltd., Tokyo (JP)

(72) Inventors: Kengo Moriyasu, Tokyo (JP); Tamami Saga, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1 day.

(21) Appl. No.: 16/795,777

(22) Filed: Feb. 20, 2020

(65) Prior Publication Data
US 2020/0333963 A1 Oct. 22, 2020

(30) Foreign Application Priority Data

Apr. 19, 2019 (JP) .............................. JP2019-080055

(51) Int. Cl.
*G06F 3/06* (2006.01)
*G06F 13/16* (2006.01)
(52) U.S. Cl.
CPC ............ *G06F 3/0611* (2013.01); *G06F 3/065* (2013.01); *G06F 3/0619* (2013.01); *G06F 3/0647* (2013.01); *G06F 3/0659* (2013.01); *G06F 3/0673* (2013.01); *G06F 13/1668* (2013.01)

(58) Field of Classification Search
CPC .... G06F 3/0619; G06F 3/0673; G06F 3/0647; G06F 3/0653; G06F 21/568
See application file for complete search history.

(56) References Cited

U.S. PATENT DOCUMENTS 7,221,185 B1 5/2007 Yu et al.
2020/0226256 A1* 7/2020 Gaurav ............... G06F 16/2365

FOREIGN PATENT DOCUMENTS

JP 2005-018738 A 1/2005

* cited by examiner

*Primary Examiner* — Edward J Dudek, Jr.
(74) *Attorney, Agent, or Firm* — Mattingly & Malur, PC

(57) ABSTRACT

A storage system is connected to a computer and includes a controller that processes an IO request from the computer and a storage device that reads or writes data in response to the IO request, and the controller configures a volume constituted by the storage device, manages a time at which data is stored at a virtual address of the volume from the computer, calculates a standard deviation indicating a variation in the write time to the virtual address of the volume, and outputs a timing at which a value of the standard deviation starts to decrease as a restoration time.

5 Claims, 21 Drawing Sheets

FIG.6

LAST DATA STORAGE TIME TABLE 401
Volume ID = 00:00:03

| VIRTUAL ADDRESS NUMBER | LAST DATA STORAGE TIME |
|---|---|
| 0 | 2018-01-05T12:33:11Z |
| 1 | 2018-01-05T12:33:11Z |
| ... | ... |

FIG.7

STANDARD DEVIATION TABLE 402
Volume ID = 00:00:03

| n | CALCULATION START TIME | STANDARD DEVIATION |
|---|---|---|
| 0 | 2018-01-05T11:40:10Z | 0 |
| 1 | 2018-01-05T12:10:10Z | 0 |
| 2 | 2018-01-05T12:40:10Z | 145 |
| ... | | |

FIG.8

CALCULATION INTERVAL TABLE 403

Volume ID = 00:00:03

| CALCULATION INTERVAL |
|---|
| 30min |

STANDARD DEVIATION TABLE 402

Volume ID = 00:00:03

| CALCULATION START TIME | STANDARD DEVIATION |
|---|---|
| 2018-01-05T11:40:10Z | 0 |

FIG.19

STANDARD DEVIATION TABLE

Volume ID = 00:00:03

| CALCULATION START TIME | STANDARD DEVIATION |
|---|---|
| 2018-01-05T11:40:10Z | 0 |
| ... | ... |
| 2018-01-05T12:40:10Z | 145 |

FIG.20

STANDARD DEVIATION TABLE

Volume ID = 00:00:03

| CALCULATION START TIME | STANDARD DEVIATION |
|---|---|
| 2018-01-05T11:40:10Z | 0 |
| 2018-01-05T12:40:10Z | 145 |
| 2018-01-05T13:10:10Z | 936 |
| 2018-01-07T17:40:10Z | 65699 |
| 2018-01-13T06:40:10Z | 254423 |
| 2018-01-18T09:10:10Z | 402613 |
| 2018-01-31T08:10:10Z | 759143 |
| 2018-02-09T12:01:10Z | 962444 |

FIG.21

STANDARD DEVIATION TABLE

Volume ID = 00:00:03

| CALCULATION START TIME | STANDARD DEVIATION |
|---|---|
| 2018-01-05T11:40:10Z | 0 |
| 2018-01-05T12:40:10Z | 145 |
| 2018-01-05T13:10:10Z | 936 |
| 2018-01-07T17:40:10Z | 65699 |
| 2018-01-13T06:40:10Z | 254423 |
| 2018-01-18T09:10:10Z | 402613 |
| 2018-01-31T08:10:10Z | 759143 |
| 2018-02-09T12:01:10Z | 962444 |
| 2018-02-22T18:40:10Z | 1293093 |
| 2018-02-23T11:40:10Z | 1268684 |
| 2018-02-24T10:40:10Z | 484124 |
| 2018-02-25T12:40:10Z | 115882 |

# STORAGE SYSTEM AND DATA RESTORATION METHOD

CROSS-REFERENCE TO RELATED APPLICATION

The present application claims priority from Japanese application JP 2019-080055, filed on Apr. 19, 2019, the contents of which is hereby incorporated by reference into this application.

BACKGROUND OF THE INVENTION

1. Field of the Invention

The present invention relates to a data restoration technique of a storage system.

2. Description of the Related Art

Ransomware is one of computer viruses that make unauthorized changes to data in a computer system. The ransomware is a sort of malware, and a computer infected with the ransomware restricts a user from accessing to a system. In order to remove this restriction, victims are required to pay a ransom a malware author. Several types of ransomware encrypt a hard disk drive of a system, and others types of ransomware simply disable a system and display a message for urging the user to pay a ransom.

In a storage system, when data falsification by ransomware occurs, the data is restored to data before falsification or before infection using a snapshot technique. As the data is restored using the snapshot, the latest data before falsification is expected to be restored, but since the user has no data indicating when falsification was executed, restoration to confirm unfalsified data and content confirmation have to be performed multiple times, and it takes time to restore.

As a technique for shortening a data restoration time using a snapshot, a technique for shortening a data restoration time by selecting a snapshot close to a target restoration time from a plurality of snapshots of a plurality of time points is disclosed in JP 2005-018738 A.

According to JP 2005-018738 A described above, it is disclosed that the data restoration time is reduced by selecting the snapshot close to the target restoration time from a plurality of snapshots, but a method of obtaining the target restoration time, that is, a method of obtaining the target restoration time for restoring to data directly before falsification by the ransomware is not mentioned. From the viewpoint of system restoration, it is desirable that the target restoration time of data restoration is a time immediately before data falsification occurs.

SUMMARY OF THE INVENTION

In this regard, it is an object of the present invention to provide a storage system that provides a target restoration time for restoring to data before falsification and a method thereof.

In order to achieve the above object, one aspect of a storage system of the present invention is a storage system which is connected to a computer and includes a controller that processes an IO request from the computer and a storage device that reads or writes data in response to the IO request, in which the controller configures a volume constituted by the storage device, manages a time at which data is stored at a virtual address of the volume from the computer, calculates a standard deviation indicating a variation in the write time to the virtual address of the volume, and outputs a timing at which a value of the standard deviation starts to decrease as a restoration time.

According to the present invention, it is possible to detect the target restoration time before data falsification.

BRIEF DESCRIPTION OF THE DRAWINGS

FIG. 6 is a diagram illustrating an example of a last data storage time table according to an embodiment;

FIG. 7 is a diagram illustrating an example of a standard deviation table according to an embodiment;

FIG. 8 is a diagram illustrating an example of a calculation interval table according to an embodiment;

FIG. 9 is a diagram illustrating an example of a volume selection screen according to an embodiment;

FIG. 18 is a diagram illustrating a standard deviation table (immediately after volume creation) according to an embodiment;

FIG. 19 is a diagram illustrating a standard deviation table (after an operation starts) according to an embodiment;

FIG. 20 is a diagram illustrating a standard deviation table (during operation) according to an embodiment; and FIG. 21 is a diagram illustrating a standard deviation table (after data falsification) according to an embodiment.

DETAILED DESCRIPTION OF THE PREFERRED EMBODIMENTS

An embodiment will be described with reference to the appended drawings. Note that an embodiment to be described below does not limit the invention related to claims set forth below, and all of elements described in an embodiment and combinations thereof are not intended to be essential for the solutions of the invention.

In the following description, there are cases in which information is described by an expression "AAA table," but information may be expressed by any data structure. That is, the "AAA table" can be written as "AAA information" to indicate that information does not depend on a data structure.

Also, in the following description, a processor is typically a central processing unit (CPU). The processor may include a hardware circuitry that performs some or all of processes.

Also, in the following description, there are cases in which a "program" is described an entity of an operation, but since the program is executed by a CPU to perform a predetermined process while using a storage resource (for example, a memory) or the like appropriately, an actual entity of the process is a processor. Therefore, the process in which the program is described as the entity of the operation may be a process performed by a device including a processor. Further, a hardware circuitry that performs some or all of processes performed by the processor may be included.

A computer program may be installed in a device from a program source. The program source may be, for example, a program distribution server or a computer readable storage medium.

Embodiment

<1. System Configuration>

Figure 1:
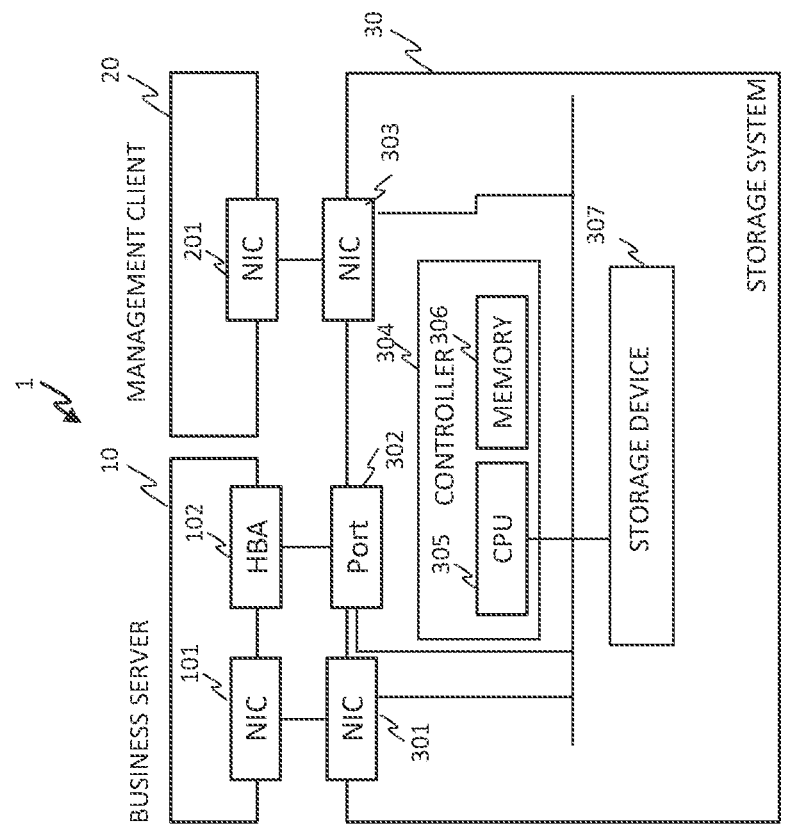
FIG. 1 is a system configuration diagram according to an embodiment.

FIG. 1 is a configuration diagram illustrating an example of a system according to the present embodiment.

A system 1 includes one or more business servers 10, one or more storage systems 30 that receive an input output (IO) request from the business servers 10, and one or more management clients 20 which are connected to the storage system 30 and manages the storage system. For the sake of description, one business server 10, one storage system 30, and one management client 20 are illustrated in FIG. 1.

The business server 10 includes a network interface card (NIC) 101 serving as an interface for a connection with the storage system 30 via a LAN and a host bus adapter (HBA) 102 that is connected to the storage system 30 and serves as an interface for transmitting an IO request to the storage system 30. The business server 10 is a computer device including a CPU serving as a processing unit and information resources such as a memory and is configured with, for example, an open system server, a cloud server, or the like. The business server 10 is a computer that transmits an IO request, that is, a write command or a read command, to the storage system 30 via a network in response to a user operation or a request from an installed program.

The management client 20 is a computer device including a CPU and information resources such as a memory and is configured with, for example, an open system server, a cloud server, or the like. The management client 20 includes a network interface card (NIC) 201 which is an interface for a connection with the storage system 30 via a LAN and includes a display unit for managing volume creation, deletion, a restoration command, and the like in the storage system 30.

The storage system 30 has a NIC 301 for connecting to the business server 10 via the LAN, a port 302 for receiving an IO request from the business server 10, and a NIC 303 for connecting to the management client 20 via the LAN. The storage system 30 includes one or more storage controllers 304 for processing the IO request from the business server 10, a storage device 307 including a plurality of drive boxes connected to one or more storage controllers 304, and a bus for connecting the respective units.

The storage controller 304 is a device in which software necessary for providing the function of the storage system 30 to the business server 10 is installed. Usually, the storage controller 304 includes a plurality of redundant storage controllers.

The CPU 305 is hardware that controls an operation of the entire storage controller 304. The CPU 305 reads/writes data from/to the storage device 307 in response to the read command or the write command that is the IO request given from the business server 10.

A memory 306 includes, for example, a semiconductor memory such as a synchronous dynamic random access memory (SDRAM) and is used to store and retain necessary programs (including an operating system (OS)) and data. The memory 306 is a main memory of the CPU 305, and stores programs (a storage control program and the like) executed by the CPU 305 or various tables referred to by the CPU 305 and is also used as a disk cache (cache memory) of the storage controller 304.

Some or all processed by the CPU 305 can be implemented by dedicated hardware such as an application specific integrated circuit (ASIC) or a field-programmable gate array (FPGA).

The storage device 307 includes various drives such as a solid state drive (SSD), a serial ATA (SATA), and a fibre channel (FC).

Also, one or more storage devices 307 are included in each drive box. The drive may include a plurality of NAND flash memory chips in addition to a NAND flash memory (hereinafter referred to as "NAND"). The NAND includes a memory cell array. This memory cell array includes a large number of NAND blocks (blocks). The block functions as an erase unit. The block is also referred to as a "physical block" or an "erase block."

The block includes a large number of pages (physical pages). That is, each block includes a plurality of pages. In the NAND, data reading and data writing are executed in units of pages. Data erasing is executed in units of blocks.

The storage device 307 conforms to NVM express (NVMe) or non-volatile memory host controller interface (NVMHCI) which is standards of a logical device interface for connecting a non-volatile storage medium.

<2. Specifying of Data Falsification Time Using Write Standard Deviation>

Figure 2:
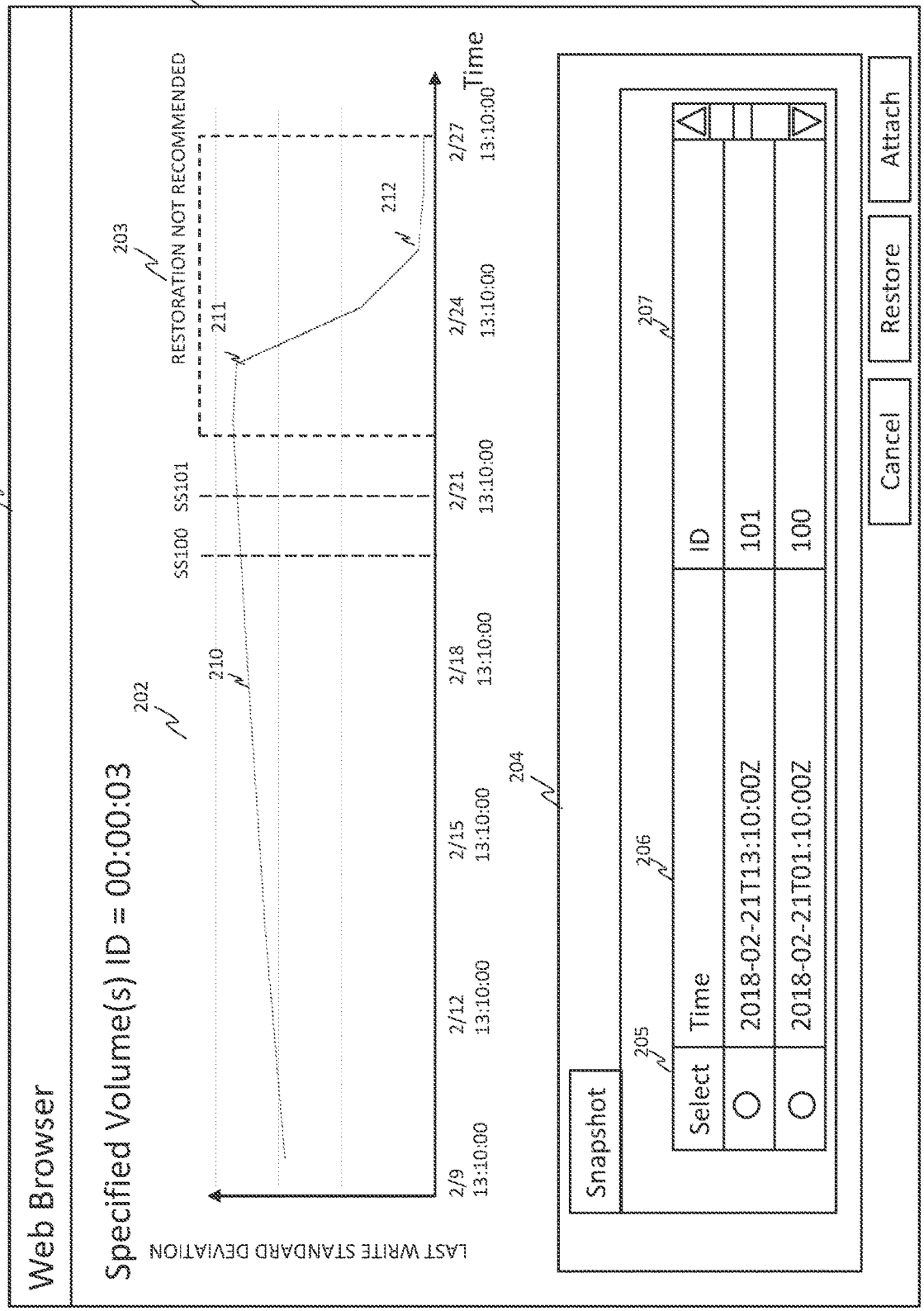
FIG. 2 is a diagram illustrating an example of a screen of a chronological graph of last write standard deviation according to an embodiment.

FIG. 2 is a diagram illustrating an example of a screen of a chronological graph of last write standard deviation according to an embodiment.

Here, the standard deviation is an index indicating a variation in a write time for a virtual address of a specific volume. The standard deviation can be obtained by Formula 1.

(Formula 1)

$$\sigma = \sqrt{\frac{1}{N} \sum_{i=1}^{N} (x_i - \mu)^2} \quad \text{Formula 1}$$

Formula 1

N=number of virtual addresses at which data of target volume is stored

Here, the virtual address is an address representing a storage area of a volume corresponding to a logical block address (LBA) included in the IO request from the business server.

x_i=last write time of target virtual address of target volume (a time converted into a UNIX (registered trademark) time)

μ=average value of last write time (a time converted into a UNIX time) of all virtual addresses at which data of target volume is stored FIG. 2 illustrates, for example, a graph 202 chronologically indicating last write standard deviation 210 for a target volume (Specified Volume (s) ID=00:00:03) and a snapshot acquisition time 204 of the target volume which are displayed on the display unit of the management client 20. A screen illustrated in FIG. 2 may be displayed on a console connected to the storage system 30 in addition to the management client 20.

As illustrated in the graph 202, a value of the last write standard deviation 210 slightly increases over time and abruptly decreases from a time point 211 of restoration not recommended 203. Then, at a time point 212, the decrease stops and indicates a substantially constant value thereafter.

This indicates that data of many virtual addresses of the target volume starts to be updated in a short time from the time point 211 by virus, and the data of many virtual addresses of the target volume is updated at the time point 212, and thus the variation in the write time at each virtual address disappears.

As described above, in a case in which normal business is performed in a state in which data is not falsified, the variation of the standard deviation is large, and its change is small. On the other hand, if the data is falsified by virus such as the ransomware, all data on the volume is encrypted and updated, and thus the variation in the writing time indicated by the standard deviation is small, and its change is large. In other words, it can be inferred that the activity of the ransomware has started from the time point 211 which is a timing at which the value of the last write standard deviation 210 starts to decrease.

In order to restore the data to a time point before falsification, a period during which it can be estimated to be falsified is displayed as the restoration not recommended 203 in FIG. 2, and it indicates that it is recommended to select a previous snapshot ID 101 among a plurality of snapshots acquired at a plurality of time points. Note that, a plurality of snapshots are displayed to be selectable from select 205 in associated with a time 206 at which the snapshot is acquired and an ID 207 of the snapshot in the snapshot acquisition time 204.

Figure 3:
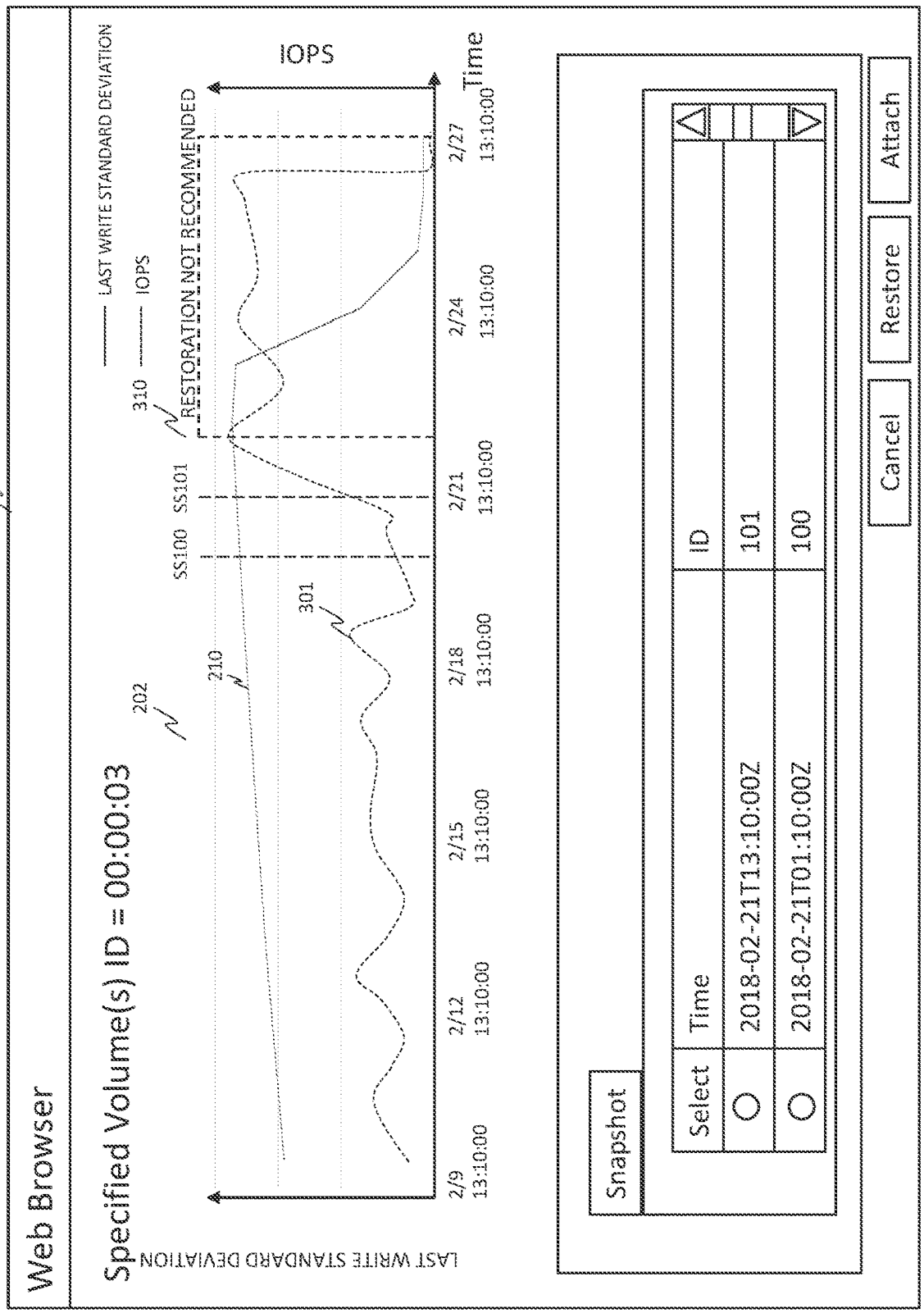
FIG. 3 is a diagram illustrating an example of a screen of a chronological graph of last write standard deviation according to an embodiment.

FIG. 3 is a diagram illustrating an example of a screen of a chronological graph of the last write standard deviation according to an embodiment, and an input/output per second (IOPS) 301 is added as performance information for monitoring in addition to the standard deviation illustrated in FIG. 2.

In FIG. 3, in the IOPS 301, at a time point 310, in addition to normal write, the number of cryptographic writes by falsification is inferred to increase. As described above, the IOPS 301 is displayed in the graph 202 in addition to the last write standard deviation 210, and thus the user can understand the data falsification time more accurately.

Figure 4:
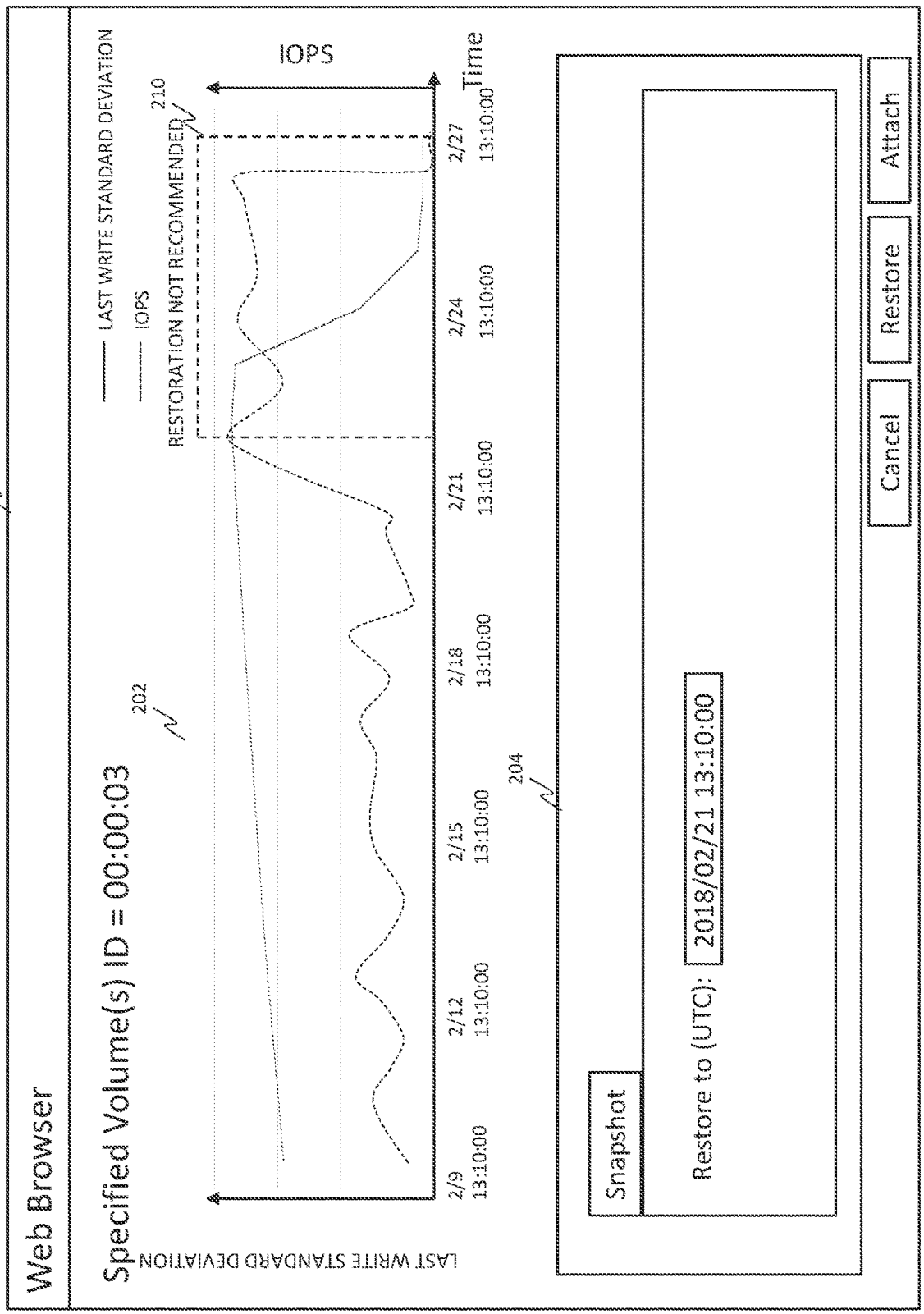
FIG. 4 is a diagram illustrating an example of a screen of a chronological graph of last write standard deviation according to an embodiment.

FIG. 4 is a diagram illustrating an example of a screen of a chronological graph of the last write standard deviation according to an embodiment. It indicates a state in which, at the snapshot acquisition time 204, the user inputs the data restoration time through an input unit of the management client 20. The user inputs 2018/02/21 13:10:00 as the data restoration time with reference to the graph 202.

The screens illustrated in FIGS. 2 to 4 may be displayed on the display unit of the management client 20 or may be displayed on the console connected to the NICs 301 and 303 of the storage system 30.

Figure 5:
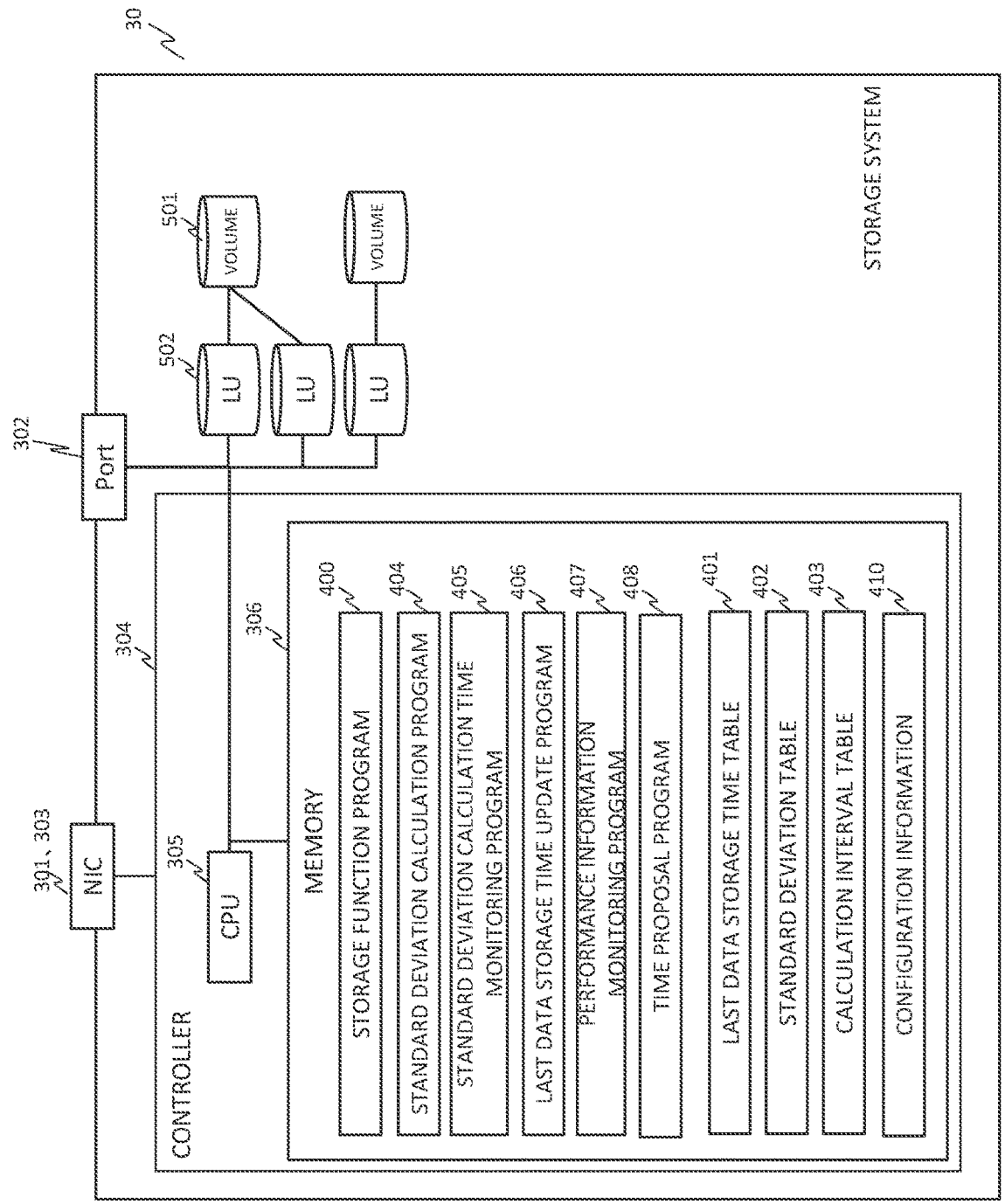
FIG. 5 is a diagram illustrating a hardware block diagram of a storage system according to an embodiment.

FIG. 5 is a diagram illustrating a hardware block of the storage system 30 according to an embodiment. The storage system 30 configures a controller 304 with a CPU (processor) 305 serving as a control unit that controls the entire storage system 30 and a memory 306. Further, the storage system 30 includes a port 302 serving as a communication interface with the business server 10, the NICs 301 and 303 for a connection with the business server 10 and the management client 20 via the LAN, and a bus for connecting them. Further, the storage system 30 creates a plurality of volumes 501 constituted by the respective drives and a plurality of logical units (LUs) 502 provided to the business server 10 from the volumes 501 as a storage area through the controller 304.

The controller 304 of the storage system 30 stores configuration information in the memory 306. The configuration information includes a relation between the volume 501 and the LU 502 and a relation between the LBA of the LU 502 (the LBA included in the IO request from the business server) and the virtual address representing the storage area of the volume 501 corresponding to the LBA of the LU 502. The volume 501 may correspond to a plurality of LUs 502 or may correspond to one LU 502. For the sake of simplicity, the following description will proceed under the assumption of a case in which the volume 501 and the LU 502 have a one-to-one correspondence, but since the correspondence relation between the LU 502 and the volume 501 is stored as configuration information 410 in the memory 306, the present embodiment can be applied even in a case in which a plurality of LUs correspond to one volume.

Also, even in a case in which the LU is provided to the business server 10 through a so-called thin provisioning function, since the correspondence relation between the LBA of the LU 502 and the virtual address of the volume is stored in the memory 306 as the configuration information 410, the present embodiment can similarly be applied.

The memory 306 of the storage system 30 stores, as various kinds of programs for realizing various kinds of functions of the storage system 30, a standard deviation calculation program 404, a standard deviation calculation time monitoring program 405, a last data storage time update program 406, a performance information monitoring program 407, and a time proposal program 408 in addition to a storage function program 400. The storage function program 400 has a function of acquiring a plurality of snapshots of a plurality of time points of a specific volume, a continuous data protection (CDP) function of acquiring a log of the IO request from the business server 10, applying the log to a volume, and causing the volume to enter a state at a certain time point, and a function of providing the LU 502 to the business server 10 as a thin provisioning volume in addition to a function of processing the IO request from the business server 10 and reading/writing data to/from the storage device.

Also, a last data storage time table 401, a standard deviation table 402, and a calculation interval table 403 which are various tables referred to by the standard deviation calculation program 404, the standard deviation calculation time monitoring program 405, the last data storage time update program 406, the performance information monitoring program 407, and the time proposal program 408 are stored.

The CPU 305 controls writing/reading of data to/from the LU 502 through the storage function program 400 and acquires the snapshot of the volume. Further, the CPU 305 realizes various kinds of functions by executing various kinds of programs stored in the memory 306. Therefore, although an actual processing entity is the CPU 305, the description may proceed using a program as a subject in order to facilitate understanding of a process of each program. Some or all of the processes performed by the CPU 305 can be realized by dedicated hardware such as an ASIC or an FPGA.

The memory 306 is configured with, for example, a semiconductor memory such as a synchronous dynamic random access memory (SDRAM) and is used to store and retain necessary programs (including an operating system (OS)) or data. The memory 306 is a main memory of the processor 305, and stores a program (a storage function program or the like) executed by the CPU 305, management information referred to by the CPU 305, and the like, and is also used as a data buffer for temporarily storing data.

<3. Various Kinds of Management Information>

FIG. 6 is a diagram illustrating an example of the last data storage time table 401 according to an embodiment. The last data storage time table 401 is a table which is stored in the memory 306 of the storage system 30 and referred to by the CPU 305 and is managed for each volume.

FIG. 6 illustrates information for managing the last data storage time of the LU corresponding to the volume whose volume ID is specified by "00:00:03," and a similar table exists for each volume of the storage system 30. A virtual address number 61 indicates an address of a volume corresponding to the LBA of the LU 502 provided to the business server 10 by the storage system 30. A last data storage time 62 indicates a last data storage time for the address specified by the virtual address number 61 and indicates that the virtual address number 61 "0" was last updated at "2018-01-05T12:33:11Z." Therefore, in a case in which data is updated on the same virtual address a plurality of times, the last updated time is stored. The last data storage time 62 may be the last write time of the virtual address converted into the UNIX time.

FIG. 7 is a diagram illustrating an example of the standard deviation table according to an embodiment. The standard deviation table 402 is a table stored in the memory 306 of the storage system 30 and referred to by the CPU 305 and is managed for each volume.

In FIG. 7, the volume ID is information for managing the standard deviation table of the LU corresponding to the volume specified by "00:00:03," and a similar table exists for each volume of the storage system 30. n71 is a number that is incremented from 0. A calculation start time 72 indicates a time at which the calculation of the standard deviation with the volume ID "00:00:03" is started, and a standard deviation 73 indicates the value of the standard deviation at each time point. FIG. 7 illustrates that, when the calculation start time 72 is "2018-01-05T11:40:10Z," the standard deviation 73 is "0," and when the calculation start time 72 is "2018-01-05T12:40:10Z," the standard deviation 73 is "145."

FIG. 8 is a diagram illustrating an example of the calculation interval table according to an embodiment. The calculation interval table 403 is a table which is stored in the memory 306 of the storage system 30 and referred to by the CPU 305 and is managed for each volume.

In FIG. 8, the volume ID is information for managing the LU calculation interval table corresponding to the volume specified by "00:00:03," and a similar table exists for each volume of the storage system 30. The example in FIG. 8 illustrates that the calculation interval is set to "30 minutes."

As described above, FIGS. 6 to 8 illustrate various kinds of tables which are stored in the memory 306 and referred to by the CPU 305, but these are merely examples. Further, although information is described using an expression "table," information may be expressed using a certain data structure.

<4. Management Screen>

Figure 9:
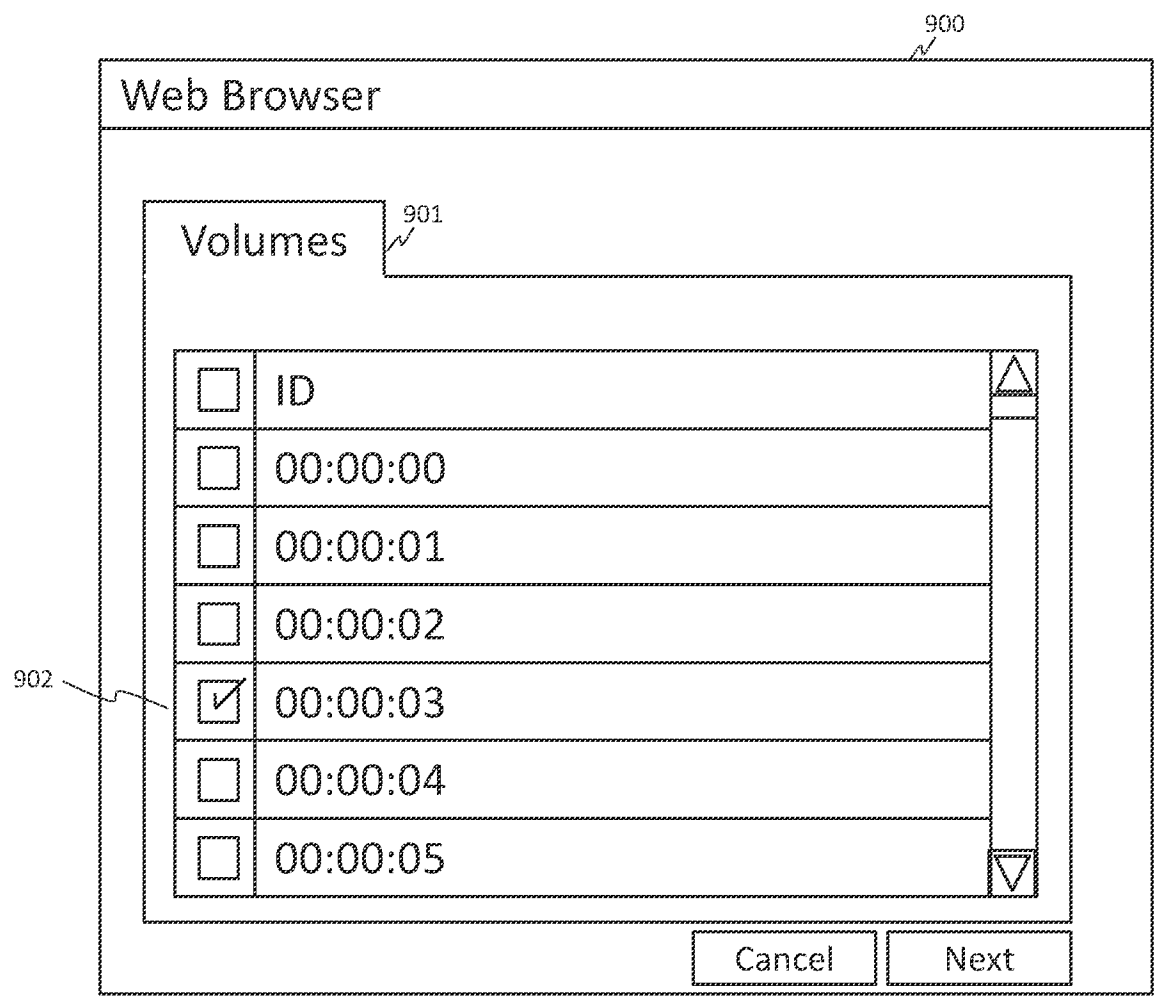

FIG. 9 is a diagram illustrating an example of the volume selection screen according to an embodiment. In a volume selection screen 900, a volume 901 to be managed is displayed, and at least one specific volume can be selected. The volume selection screen 900 is displayed on the display unit of the management client 20 under the control of the standard deviation calculation program 404.

Figure 10:
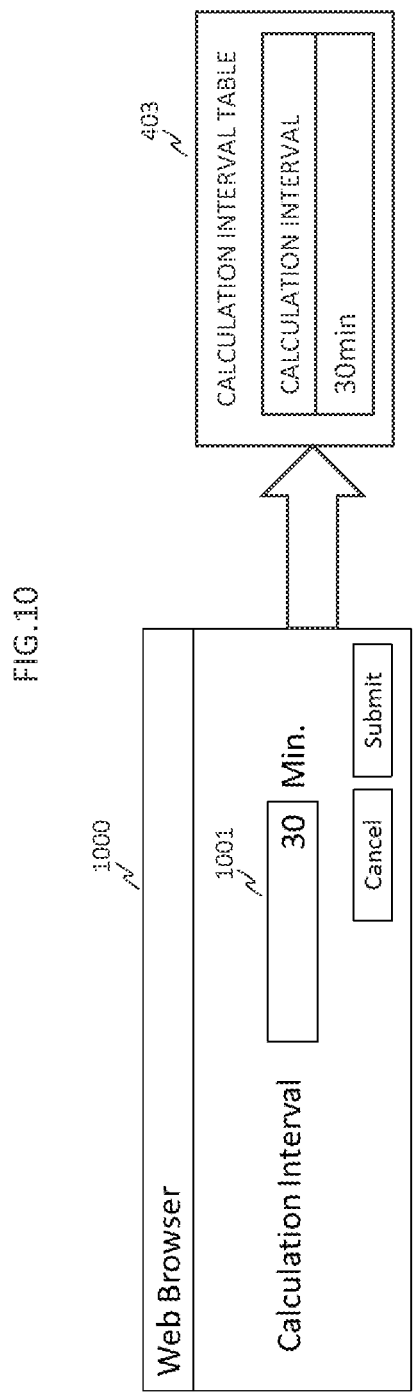
FIG. 10 is a diagram illustrating an example of a calculation interval input screen according to an embodiment.

FIG. 10 is a diagram illustrating an example of a calculation interval input screen according to an embodiment. A calculation interval input screen 1000 is a screen for setting the calculation interval. In FIG. 10, the calculation interval is set to 30 minutes. The calculation interval input screen 1000 is displayed on the display unit of the management client 20 under the control of the standard deviation calculation time monitoring program 405. If the user inputs the calculation interval on the calculation interval input screen 1000, the standard deviation calculation time monitoring program 405 stores the calculation interval in the calculation interval table 403.

The management screens illustrated in FIGS. 9 and 10 may be displayed on the console connected to the NICs 301 and 303 of the storage system 30, similarly to the screens illustrated in FIGS. 2, 3, and 4.

<5. Various Kinds of Operation Flow>

Figure 11:
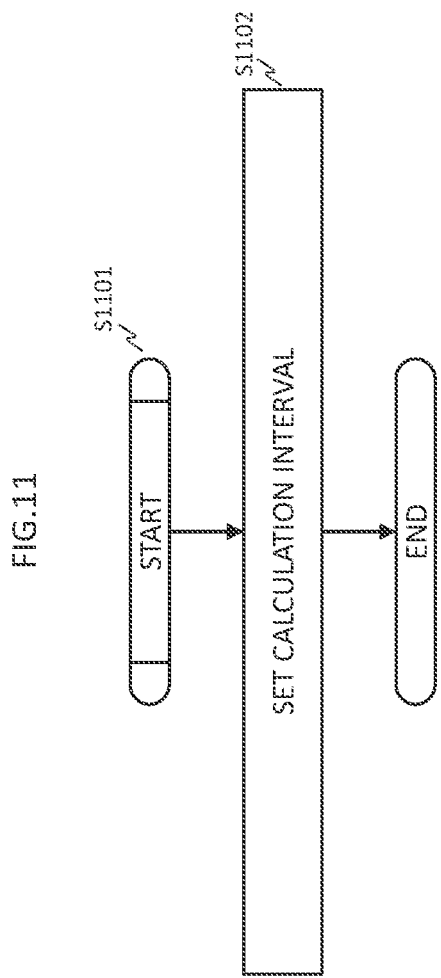
FIG. 11 is a diagram illustrating a process flow of a calculation interval setting according to an embodiment.

FIG. 11 is a diagram illustrating a process flow of the calculation interval setting according to an embodiment. The processing is started when the calculation interval is input through the calculation interval input screen in FIG. 10 (step S1101), and the standard deviation calculation time monitoring program 405 stores the input calculation interval in the calculation interval table 403 (step S1102).

Figure 12:
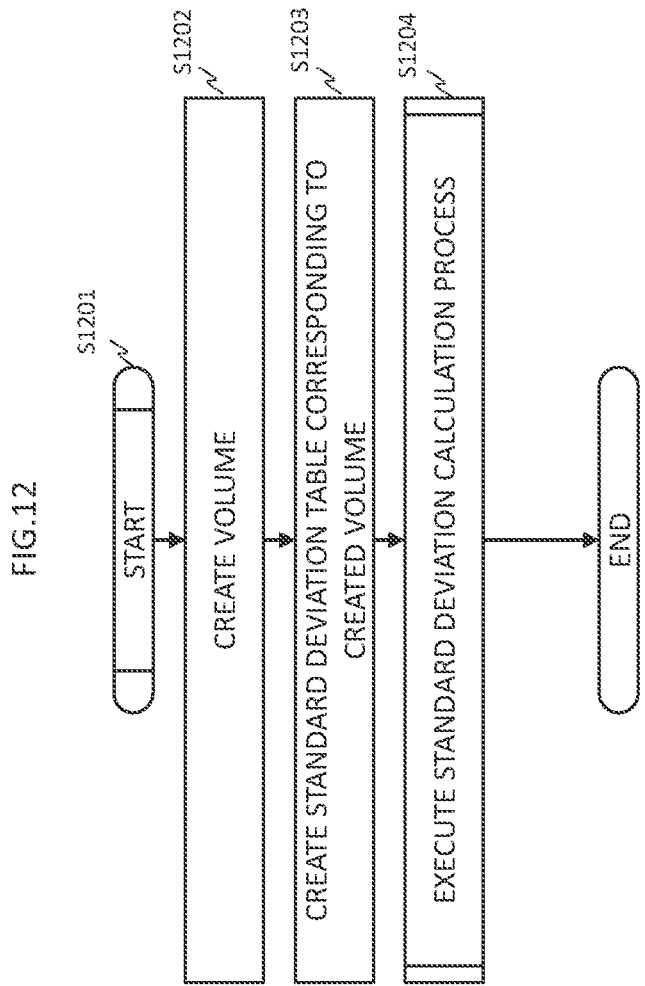
FIG. 12 is a diagram illustrating a process flow of volume creation according to an embodiment.

FIG. 12 is a diagram illustrating a process flow of volume creation according to an embodiment. The storage system 30 is started upon receiving a new volume creation request from the management client 20 (step S1201), and a new volume is created by the storage function program 400 (step S1202). If the volume is created, the standard deviation calculation program 404 creates the standard deviation table 402 by associating it with the ID of the created volume (step S1203). "0" is input for the standard deviation immediately after the volume is created. The last data storage time update program 406 stores the write time of each virtual address for the created volume in the last data storage time table 401 illustrated in FIG. 6. The standard deviation calculation program 404 calculates the standard deviation for the created volume on the basis of the last data storage time table 401 (step S1204). The calculated standard deviation is stored in the standard deviation table 402 together with the calculation time by the standard deviation calculation program 404.

Figure 13:
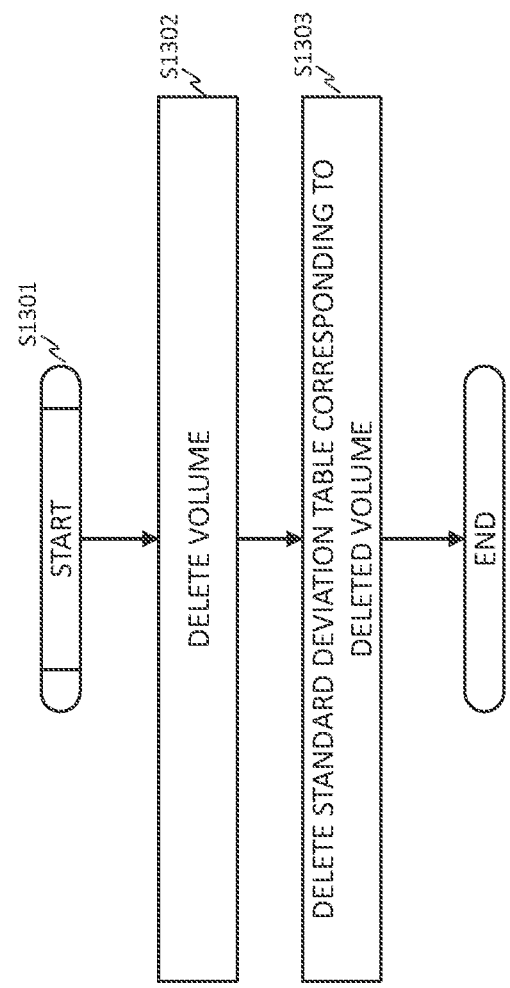
FIG. 13 is a diagram illustrating a process flow of volume deletion according to an embodiment.

FIG. 13 is a diagram illustrating a process flow of volume deletion according to an embodiment. The storage system 30 is started upon receiving a volume deletion request from the management client 20 (step S1301), and the volume is deleted by the storage function program 400 (step S1302). If the volume is deleted, the last data storage time table 401, the standard deviation table 402, and the like corresponding to the deleted volume are also deleted (step S1303).

Figure 14:
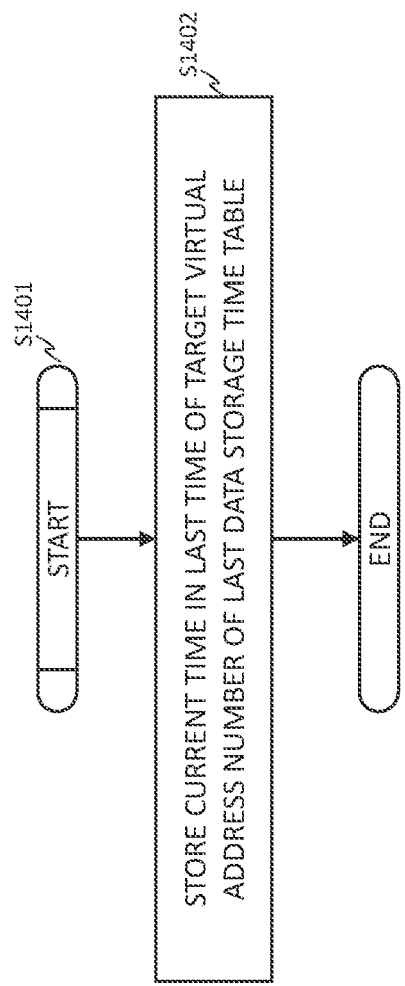
FIG. 14 is a diagram illustrating a process flow of last data storage time update according to an embodiment.

FIG. 14 is a diagram illustrating a process flow of last data storage time update by the last data storage time update program 406 according to an embodiment. If there is a data write request for a target volume, the process starts (step S1401). In step S1402, the current time is stored in the last time of the target virtual address number of the last data storage time table 401. If there are two or more data write requests for the same virtual address, the last data storage time 62 is updated by the last write time. Thus, the last data update time is managed by the last data storage time table 401 for all the virtual addresses of the target volume.

Figure 15:
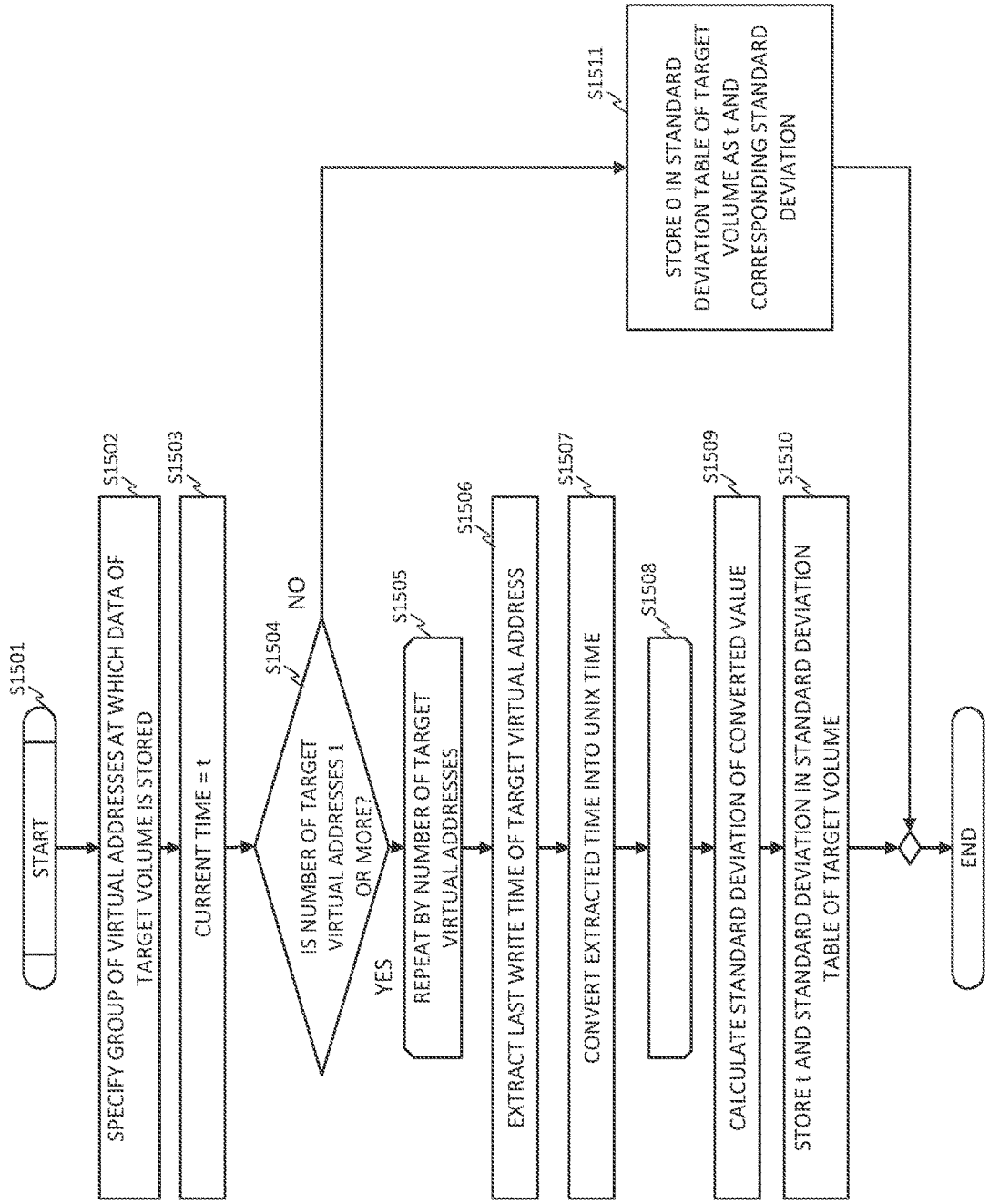
FIG. 15 is a diagram illustrating a process flow of standard deviation calculation according to an embodiment.

FIG. 15 is a diagram illustrating a process flow of the standard deviation calculation executed by the standard deviation calculation program 404 according to an embodiment.

The standard deviation calculation program 404 starts the process if creation of a new volume is received from the management client 20 or if a standard deviation calculation request for an existing volume is received (step S1501). The process may start at a timing at which a new volume creation request is received from the management client 20, and a report indicating that a new volume is created by the storage function program 400 is received in addition to a timing at which creation of a new volume is received from the management client 20.

In step S1502, the standard deviation calculation program 404 specifies a group of virtual addresses at which the data of the target volume is stored.

In step S1503, the standard deviation calculation program 404 acquires the current time=t.

In step S1504, the standard deviation calculation program 404 determines that the number of target virtual addresses is 1 or more, and proceeds to step S1505 in the case of YES and proceeds to step S1511 in the case of NO.

In step S1505, a loop process in which the steps of step S1505 to step S1508 are repeated by the number of target virtual addresses is repeated is started.

In step S1506, the last write time of the target virtual address is extracted. This step is performed by reading the last time (the last data storage time 62 of FIG. 6) of the target virtual address described in FIG. 14. Note that, as described with reference to FIG. 14, for the write process to all the virtual addresses of the target volume started in step S1501, the last data storage time is stored together with the virtual address number by the last data storage time update program 406 as illustrated in FIG. 6, and in step S1506, the last data storage time illustrated in FIG. 6 is extracted.

In step S1507, the time extracted by the last data storage time update program 406 is converted into the UNIX time. In a case in which the last data storage time stored in FIG. 6 is a time which has already been converted into the UNIX time, the process of step S1507 can be omitted.

In a case in which there is another virtual address at which data is written in step S1508, the process returns to step S1505 and repeats the process of steps S1506 and S1507.

If the process ends for all the virtual addresses at which data is written, the process proceeds to step S1509, and in step S1507, the standard deviation of the converted value for the target volume is calculated by Formula 1.

Then, in step S1510, the current time t and the standard deviation calculated in step S1509 are stored in the standard deviation table 402 of the target volume illustrated in FIG. 7.

In a case in which the target virtual address is 0, in step S1511, 0 is stored in the standard deviation table 402 of the target volume as the current time t and the corresponding standard deviation.

Figure 16:
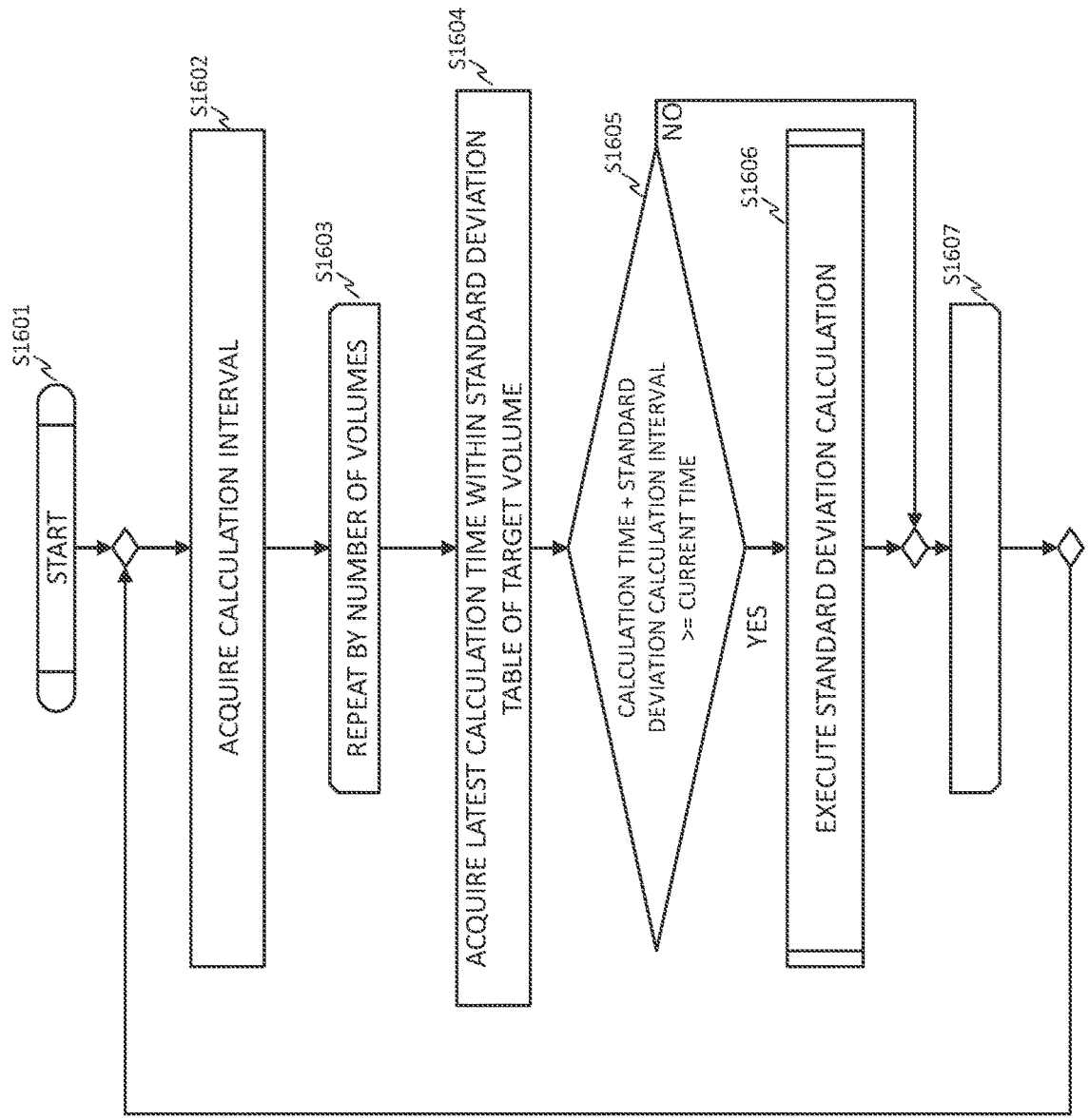
FIG. 16 is a diagram illustrating a process flow of periodic execution of standard deviation calculation according to an embodiment.

FIG. 16 is a diagram illustrating a process flow of periodic execution of the standard deviation calculation by the standard deviation calculation program 404 according to an embodiment. If the process is started (step S1601), the standard deviation calculation program 404 acquires the calculation interval stored in the calculation interval table 403 (step S1602).

Then, the loop process in which the process of step S1603 to step S1607 is repeated by the number of target volumes for which the standard deviation calculation is performed is started (step S1603).

In step S1604, the latest calculation time within the standard deviation table 402 of the target volume is acquired. In the example of the standard deviation table 402 in FIG. 7, "2018-01-05T12:40:10Z" is acquired.

Then, in step S1605, it is determined whether or not the calculation time+the standard deviation calculation interval>=the current time. In other words, it is determined whether or not the time for calculating the standard deviation has passed for the target volume. In the case of NO in step S1605, the process proceeds to step S1607, and the process starting from step S1602 is repeated. In the case of YES in step S1605, the process proceeds to step S1606, and the standard deviation calculation for the target volume is executed by Formula 1.

Figure 17:
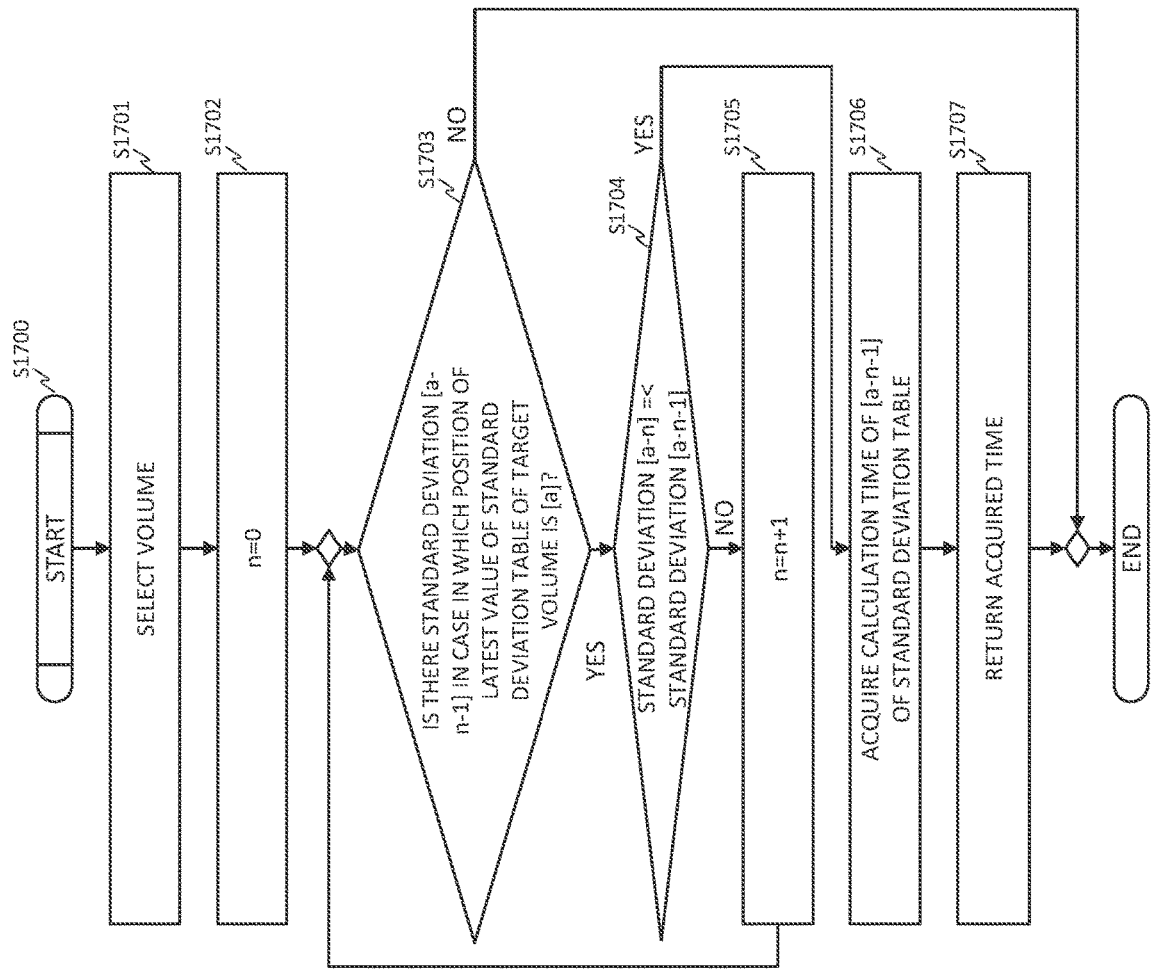
FIG. 17 is a diagram illustrating a process flow of data falsification time specifying according to an embodiment.

FIG. 17 is a diagram illustrating a process flow of data falsification time specifying by the time proposal program 408 according to an embodiment.

If the process is started, in step S1701, the user selects a volume and inputs the selected volume to the time proposal program 408. Then, 0 is input to the variable n.

In step S1703, it is determined whether or not there is a standard deviation [a-n-1] in a case in which the position of the latest value of the standard deviation table of the target volume is [a]. That is, it is determined whether or not there are two or more entries (the calculation start time and the standard deviation) in the standard deviation table of the target volume. In the case of FIG. 7, the determination result is YES because there are three entries. In a case in which there are less than two target entries, the process ends.

In a case in which there are two or more target entries, the process proceeds to step S1704, and it is determined whether or not the standard deviation [a-n]=<the standard deviation [a-n-1]. In other words, it is determined whether or not the value of the standard deviation decreases over time. In a case in which the determination result is YES, the process proceeds to step S1706; and in a case in which the determination result is NO, the process proceeds to step S1705. In other words, in a case in which the value of the standard deviation is falling to the right (in the case of YES) as illustrated in the restoration not recommended 203 of graph 202 of FIG. 2, the process proceeds to step S1706, and the calculation time of [a-n-1] of the standard deviation table is acquired. In step S1707, the acquired time is suggested as the restoration time before data falsification starts.

In step S1705, 1 is added to n, and the next entry becomes the processing target.

As a time at which the data falsification is started on the basis of the slope of the standard deviation is specified as described above, the restoration time can be provided to the user.

<Standard Deviation Table>

The standard deviation table at each stage of the target volume will be described with reference to FIGS. 18 to 21.

FIG. 18 is a diagram illustrating the standard deviation table (immediately after volume creation) according to an embodiment, FIG. 19 is a diagram illustrating the standard deviation table (after an operation starts) according to an embodiment, FIG. 20 is a diagram illustrating the standard deviation table (during operation) according to an embodiment, and FIG. 21 is a diagram illustrating the standard deviation table (after data falsification) according to an embodiment.

First, FIG. 18 illustrates the standard deviation table immediately after volume creation. The calculation start time 72 indicates the calculation start time of the standard deviation of the target volume. The volume creation time may be input as the calculation start time 72. Immediately after the volume is created, it is a state in which no data is stored at any virtual address, that is, a state in which writing of each virtual address to the target volume is not performed, and the write time is not input, and thus the standard deviation 73 becomes "0."

Then, in FIG. 19, if the operation of the created volume is started, writing to some virtual addresses occurs, the writing time is managed, and the writing time gradually varies. At the calculation start time "2018-01-05T12:40:10Z," "145" is calculated as the standard deviation.

FIG. 20 illustrates the standard deviation table during the period in which the created volume is operating (during operation). Compared to FIG. 19, it is increasing from entries 2001 to 2006. The standard deviation also increases over time.

FIG. 21 illustrates the standard deviation table after data falsification. The standard deviation increases up to an entry 2101, but it turns to decrease from an entry 2102. In an entry 2103 and an entry 2104, the reduction rate of the standard deviation is increasing. Since the variation of the write time for the virtual address is increasing up to an entry 2101 for the target volume, the normal operation is inferred to be performed, and since the standard deviation decreases at the calculation start time "2018-02-23T11:40:10Z" of the entry 2102, unauthorized writing is inferred to start from this time point due to the virus.

As described above, in the present embodiment, the time point of the entry 2101 is suggested to the user as the restoration time from the change in the standard deviation, and thus the data before the falsification can be restored more rapidly than the technique of the related art of repeatedly selecting and verifying a plurality of snapshots.

Further, the IOPS is monitored as the performance information of the target volume, and thus it is possible to specify the data falsification timing in further detail.

Furthermore, in the present embodiment, the time before the data falsification can be specified by obtaining the standard deviation using the write time for the target volume of the storage system, and thus there is no need for an additional appliance, introduction of an application to a server, or the like.

What is claimed is:

1. A storage system which is connected to a computer, comprising:
   a controller that processes an IO request from the computer;
   a display connected to the controller; and
   a storage device that reads or writes data in response to the IO request,
   wherein the controller:
   configures a volume constituted by the storage device,
   manages a time at which data is stored at a virtual address of the volume from the computer,
   calculates a standard deviation indicating a variation in the write time to the virtual address of the volume,
   monitors an IOPS for the volume,
   outputs a timing at which a value of the standard deviation starts to decrease as a restoration time,
   generates a plurality of snapshots of a plurality of time points of the volume,
   selects a snapshot immediately before the restoration time from among the plurality of snapshots and restores the data of the volume, and
   displays on the display a graph displaying the standard deviation for the volume and the IOPS for the volume monitored by the controller chronologically and a selection screen of the plurality of snapshots.

2. The storage system according to claim 1, wherein the controller configures a plurality of volumes,
   manages the time at which the data is stored at the virtual address of the volume for the plurality of volumes,
   calculates the standard deviation indicating the variation in the write time to the virtual address of the volume for the plurality of volumes, and
   outputs the timing at which the value of the standard deviation starts to decrease as the restoration time for the plurality of volumes.

3. The storage system according to claim 1, wherein the controller calculates the standard deviation on the basis of a last write time of the virtual address and an average value of the last write times of all virtual addresses at which data of the volume is stored.

4. The storage system according to claim 1, wherein the controller includes a memory that stores a value of the standard deviation in association with a calculation start time at which calculation of the standard deviation of the volume is started.

5. A storage system which is connected to a computer, comprising:
   a controller that processes an IO request from the computer;
   a display connected to the controller; and
   a storage device that reads or writes data in response to the IO request,
   wherein the controller:
   configures a volume constituted by the storage device,
   manages a time at which data is stored at a virtual address of the volume from the computer,
   calculates a standard deviation indicating a variation in the write time to the virtual address of the volume,
   monitors an IOPS for the volume,
   outputs a timing at which a value of the standard deviation starts to decrease and the IOPS increases as a restoration time,
   generates a plurality of snapshots of a plurality of time points of the volume,
   selects a snapshot immediately before the restoration time from among the plurality of snapshots and restores the data of the volume, and
   displays on the display a graph displaying the standard deviation for the volume and the IOPS for the volume monitored by the controller chronologically and a selection screen of the plurality of snapshots.

* * * * *